June 25, 1957 G. A. OLIVER 2,796,868
COMBINE CYLINDER
Filed Oct. 22, 1953
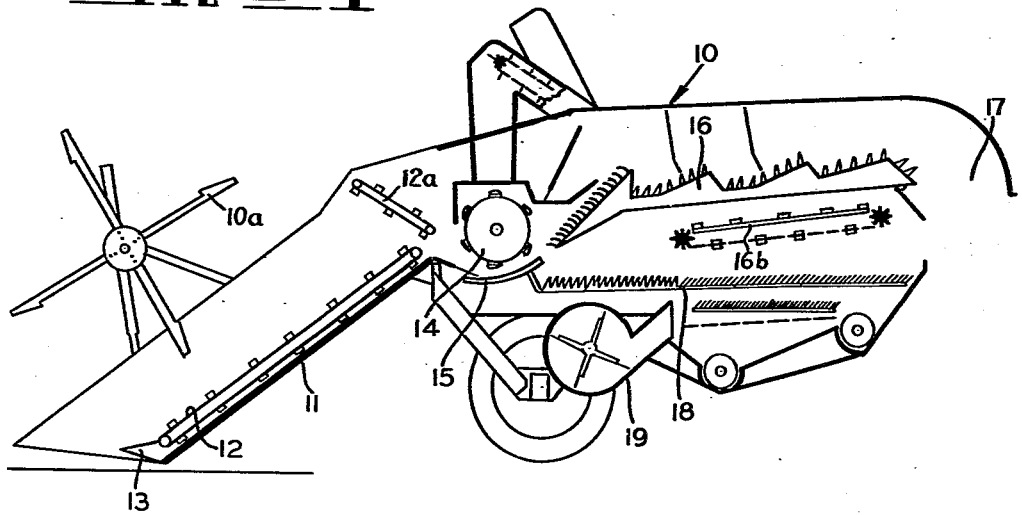
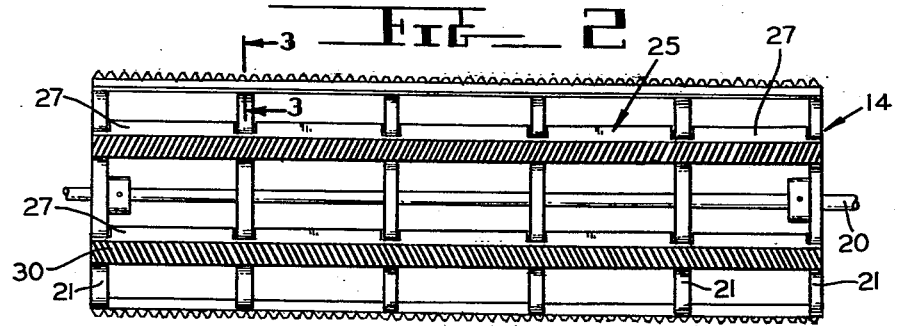
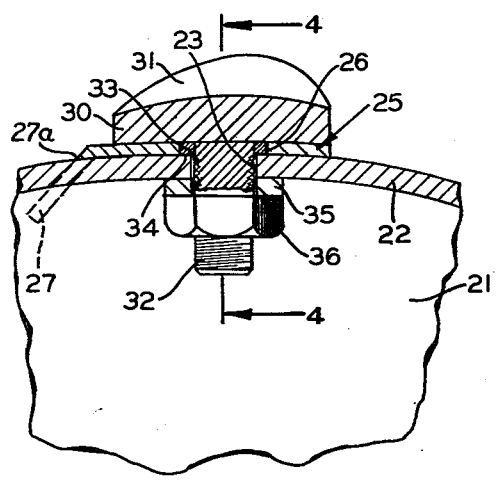
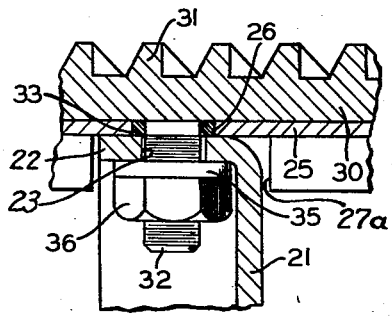
INVENTOR.
GEORGE A. OLIVER
BY
ATTORNEYS United States Patent Office 2,796,868
Patented June 25, 1957

2,796,868

COMBINE CYLINDER

George A. Oliver, Indianola, Iowa, assignor, by mesne assignments, to Ford Motor Company, Dearborn, Mich., a corporation of Delaware Application October 22, 1953, Serial No. 387,702

1 Claim. (Cl. 130—27)

The present invention relates to a combine cylinder and, more particularly, to a threshing cylinder of simple, inexpensive, and efficient design.

In the harvesting of grain crops, the grain is threshed by the action of a threshing cylinder acting upon the cut crop held against a concave element. Modern cylinders are generally of the rasp bar type, having a plurality of circumferentially spaced, axially extending rasp bars rotatable about a central longitudinal axis. The cylinder structure has previously been quite complex due to the high centrifugal forces developed and the difficulty of removably retaining the rasp bars in position at the cylinder circumference.

The present invention provides an extremely simple, inexpensive and efficient cylinder of the rasp bar type. The rasp bars are provided with integral studs for direct attachment to the cylinder supporting structure, and a wind control element is interposed between each rasp bar and the associated supporting structure. The wind control elements have forwardly and radially deflected current-generating surfaces for aiding in the threshing process by positioning cut material for threshing, removing threshed grain from the threshing area, and preventing wrapping of material about the rasp bars.

It is, therefore, an important object of the present invention to provide an improved threshing cylinder for a combine.

Another important object is the provision of an improved threshing cylinder of simple, inexpensive, and efficient design.

It is a further object to provide a combine cylinder having rasp bars secured to spaced carrying discs and having wind control elements interposed between the bars and the discs to aid in securing the bars in assembly and to increase the efficiency of the threshing operation.

Still another object of the present invention is the provision of a threshing cylinder for a combine wherein a wind control element is provided having a radially inwardly extending leading surface for preventing wrapping of the threshed material about the element and for generating wind currents during rotation of the cylinder.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a schematic sectional view of a combine provided with a threshing cylinder of the present invention;

Figure 2 is an elevational view of a cylinder of the present invention;

Figure 3 is an enlarged fragmentary sectional view taken along the plane 3—3 of Figure 2; and Figure 4 is an enlarged fragmentary sectional view, with parts shown in elevation, taken along the plane 4—4 of Figure 3.

As shown on the drawings:

In Figure 1 reference numeral 10 refers generally to a combine having a reel 10a which gathers in the crop and pushes it rearwardly against the cutter bar 13. The cut grain is deposited on rearwardly running lower draper 12 in the header 11 and with the aid of the upper draper 12a feeds it to a threshing element of the present invention 14. The cylinder 14 cooperates with a lower concave 15 to thresh the grain from the straw. From the cylinder, the straw passes rearwardly over straw racks 16 for discharge rearwardly from the combine, as at 17. Grain and chaff separated from the straw at the racks 16 fall downwardly onto a grain pan and sieve 18 and/or onto the forwardly traveling raddle conveyor 16b and then onto the grain pan and sieve 18 at which the grain is separated in the air blast from a winnowing fan 19.

The present invention is concerned primarily with the threshing cylinder 14, and this cylinder is illustrated in detail in Figures 2-4, inclusive. More particularly, the cylinder 14 includes a central, axially extending drive shaft 20 upon which are mounted axially spaced, radially extending mounting discs 21. The discs 21, as best illustrated in Figure 4, are provided with terminal flanges 22 lying normal to the plane of the discs and extending substantially axially of the shaft 20. The discs are provided with a plurality of circumferentially spaced apertures 23 formed in the flanges 22 thereof, for a purpose to be hereinafter more fully described.

Overlying the discs and extending along the axial length of the cylinder assembly 14 are a plurality of circumferentially spaced wind control elements indicated generally at 25. The elements 25 are slightly arcuate in cross-section so as to snugly conform to the peripheral flanges 22 (Figure 3) and the elements are provided with apertures 26 registering with and of substantially larger diameter than the apertures 23. The elements 25 are provided with a forward terminal radially inwardly projecting extensions 27. The extensions 27 extend radially inwardly beyond the flange 22 and are notched as shown at 27a in Figures 2 and 3 to receive the flanges as best shown in Figures 2 and 3.

Overlying the control elements 25 are axially extending elongated rasp arms 30 having axially spaced radially extending rasp projections 31 which serve to perform the actual threshing operation in cooperation with the concave 15. It will be noted that the rasp bars snugly abut the upper surfaces of the control elements 25 and that the under surfaces of the rasp bar carry integral radially inwardly projecting studs 32 which are exteriorly threaded at their radially inner ends. The studs 32 project through the registering radial apertures 23 and 26 formed in the disc flanges 22 and the wind control elements 25, respectfully. The studs 32 are preferably secured to the rasp bars by stud welding, an operation which, as part of the welding procedure, forms a radially enlarged, generally annular welding flash projection 33 surrounding the stud 32 at its point of juncture with associated rasp bar 30. The aperture 26 in the wind control element 25 is of such size as to snugly receive the welding flash projection 33, and the flash projection provides an integral shoulder 34 which abuts the flange 22 in surrounding relationship with the flange aperture 23.

The stud 32 receives a lock washer 35 thereabout abutting the inner surface of the flange 22, and a lock nut 36 is threadedly retained by the stud 32 to secure the lock washer 35, the flange 22, the wind control element 25, and the rasp bar 30 in assembled relation.

The simplicity of the structure of the present invention will be appreciated since no extraneous securing parts are necessary, it is not necessary to build up supporting surfaces for the rasp bars, and the cylinder structure is rigidified by the wind control elements and the rasp bars themselves. Further, the economy of the device will be evident in the fact that the reinforcing parts also form the actual threshing mechanism.

The wind control elements 25 are provided with the inwardly projecting extensions 27 which generate desired wind currents during cylinder rotation to properly feed the cut grain to the cylinder. Also, the extensions 27 prevent wrapping of the material being threshed about the rasp bars, and the extensions, being inclined toward the rasp bars, tend to position the material being threshed for proper entry between the cylinder and the concave.

Accordingly, it will be appreciated that the present invention provides a new and novel combine cylinder of simple, inexpensive and efficient design.

It will, of course, be understood that many details of construction may be varied through a wide range without departing from the principles of this invention and it is, therefore, not the purpose to limit the patent granted hereon otherwise than necessitated by the scope of the appended claim.

I claim:

A threshing cylinder, comprising an axially extending shaft; a plurality of similar disc-like elements coaxial with the shaft and mounted at intervals therealong, said disc-like elements having cylindrical peripheral flanges; circumferentially spaced, elongated wind control elements formed of flat strips extending longitudinally of the cylinder, overlying said flanges, and having their leading edges turned inwardly through an acute angle, the leading edges of the wind control elements being notched to receive the flanges of the disc-like elements; and a series of circumferentially spaced rasp bars, one rasp bar overlying each wind control element, the rasp bars having radially inwardly projecting threaded studs welded to the inner face thereof, extending through the underlying wind control element and peripheral flange and secured by nuts on the inner faces of the flanges, the studs having radially extended annular portions adjacent the inner faces of the rasp bars formed at least in part as a flash projection from welding the studs, the studs being received within bores in the flanges and the radially extended portions of the studs within somewhat larger bores in the wind control elements.

References Cited in the file of this patent

UNITED STATES PATENTS

| | | |
|---|---|---|
| 659,132 | Butterworth | Oct. 2, 1900 |
| 806,537 | Gill | Dec. 5, 1905 |
| 2,256,010 | Aushherman | Sept. 16, 1941 |
| 2,283,402 | Welty | May 19, 1942 |